United States Patent [19]

Thomas

[11] Patent Number: 4,866,296
[45] Date of Patent: Sep. 12, 1989

[54] CIRCUIT INTERRUPT SYSTEM

[76] Inventor: Stephen R. Thomas, 1400 Coolidge, Great Bend, Kans. 67530

[21] Appl. No.: 281,678

[22] Filed: Dec. 9, 1988

[51] Int. Cl.⁴ ............................................. B60R 25/04
[52] U.S. Cl. .................................... 307/141; 307/10.2; 180/287
[58] Field of Search .................. 307/141, 10 AT; 180/114, 287; 340/64, 63, 53

[56] References Cited

U.S. PATENT DOCUMENTS

| | | | |
|---|---|---|---|
| 3,885,164 | 5/1975 | Vest | 307/10 AT |
| 4,063,610 | 12/1977 | Shilling | 307/10 AT X |
| 4,175,635 | 11/1979 | Thomas | 307/10 AT X |
| 4,317,108 | 2/1982 | Schwartz et al. | 307/10 AT X |
| 4,485,887 | 12/1984 | Morano | 307/10 AT X |

Primary Examiner—William M. Shoop, Jr.
Assistant Examiner—Sharon D. Logan
Attorney, Agent, or Firm—Litman, McMahon & Brown

[57] ABSTRACT

An interrupt system for a circuit includes a single-pole, double-throw selector switch. The circuit may comprise an ignition circuit including a coil and a distributor normally innerconnected by a distributor wire. The selector switch has a first terminal, a second terminal connected to the coil and a third terminal connected to the distributor. The selector switch is movable between a first position connecting the first and second terminals and a second position connecting the second and third terminals. A delay switch is connected to the first and third terminals and has a normally closed position. The delay switch opens automatically in response to electrical current flowing therethrough.

13 Claims, 1 Drawing Sheet

U.S. Patent    Sep. 12, 1989    4,866,296
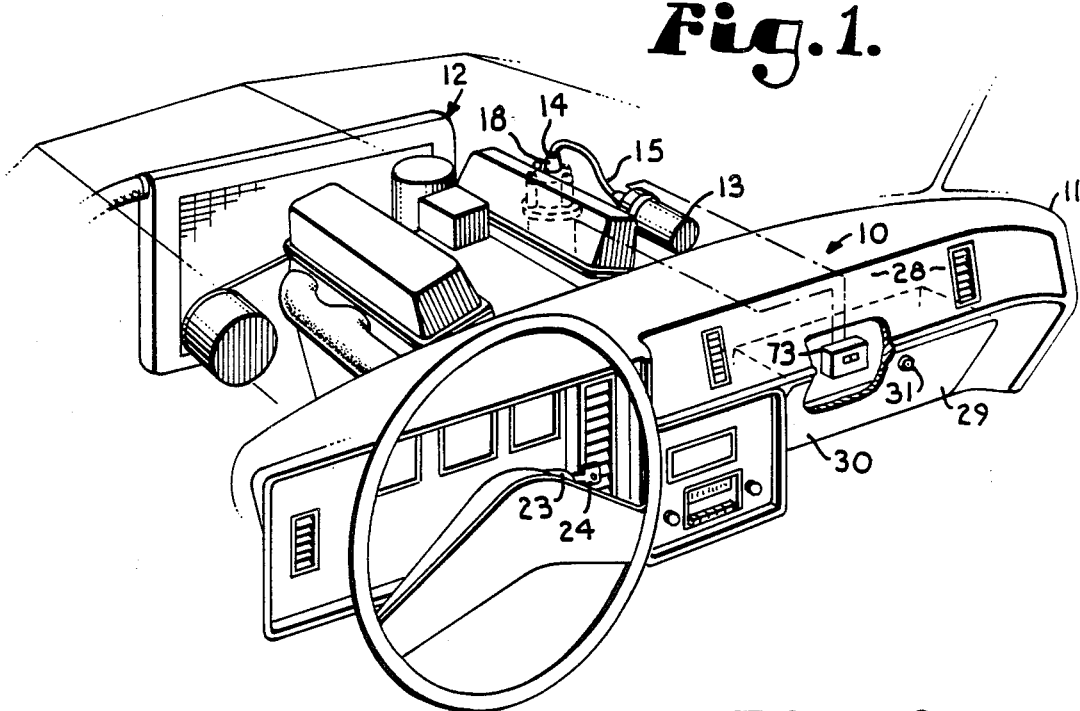
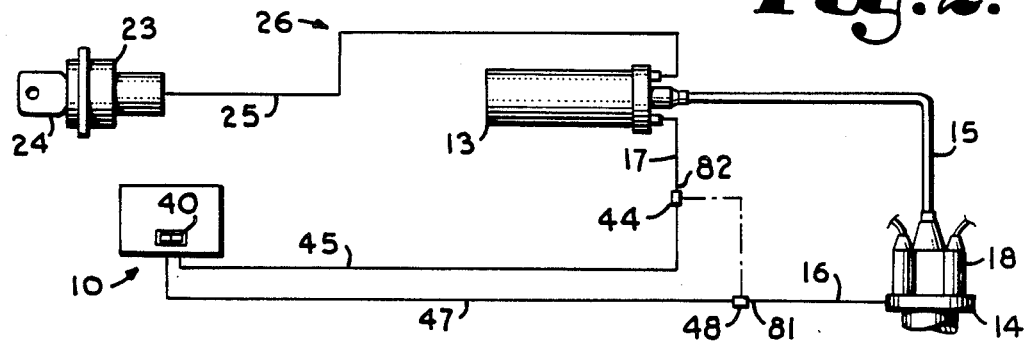
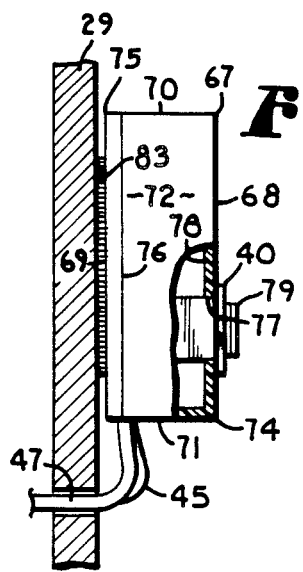
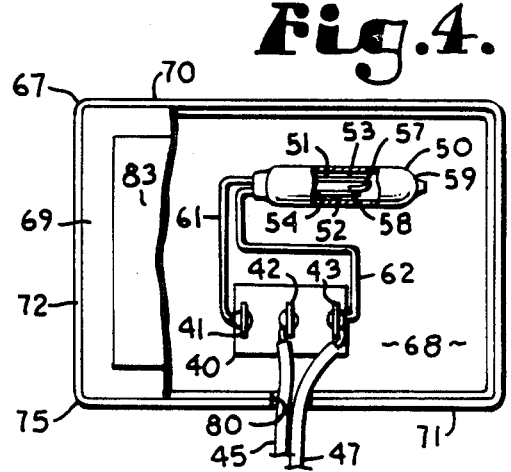

CIRCUIT INTERRUPT SYSTEM

BACKGROUND OF THE INVENTION

1. Field of the Invention

The present invention relates generally to a circuit interrupt system, more specifically to a circuit interrupt system for an internal combustion engine and in particular to a system for interrupting a vehicle ignition system to provide a measure of protection from theft of the vehicle.

2. Description of the Prior Art

It is often desirable to selectively interrupt or open a circuit, for example a vehicle ignition circuit to restrict use of the vehicle. Vehicle theft is a serious crime problem in this country. Most motor vehicles have keyed ignition systems which provide their owners with a certain measure of security. However, experienced car thieves are often able to circumvent the standard, factory-installed door and ignition locks.

A disadvantage with the standard, factory-installed security devices is that vehicle thieves can easily familiarize themselves with comparable security devices on other vehicles before taking illegal possession of a target vehicle. Experience has generally shown that most security systems devised and installed by vehicle manufacturers can be analyzed and circumvented by determined vehicle thieves.

After market security systems for retrofitting in existing vehicles are also available. These include alarm systems which sound an audible alarm, such as the vehicle horn or a siren, when the vehicle is tampered with by an unauthorized person. Other security systems require the input of a predetermined code, such as a series of numbers or letters, before the engine can be started.

Mechanical security devices are also available which physically restrain certain vehicle controls, such as the steering wheel or shift lever. Although a certain measure of security is probably provided by all of these devices, they tend to suffer from significant disadvantages relating to relatively high costs of manufacture and installation, accidental actuation which can drain the vehicle's battery, inconvenient activation and deactivation, and ineffectiveness against skilled thieves.

The losses from vehicle theft are passed on to vehicle owners in general in the form of higher insurance rates and public spending for law enforcement. Vehicle theft is a major crime problem whose active participants range from teenagers who only "borrow" vehicles for "joy rides" to organized criminal enterprises which dismantle large volumes of stolen vehicles. Owners of certain types of late model vehicles, which are highly sought by professional thieves and thus considered "targets", may particularly be penalized by widespread auto theft through higher insurance premiums.

The vehicle theft crime problem is not limited to automobiles. Trucks, construction equipment, farm equipment, boats and aircraft are all susceptible to theft losses. Many of these vehicles can be quickly transported under their own power once their engines are started. On the other hand, relatively few vehicles are stolen without starting their engines. Thus, a relatively effective way to deter vehicle theft is to prevent the unauthorized operation of vehicle engines. The circuit interrupt system of the present invention effectively addresses the aforementioned problems associated with existing vehicle security systems.

SUMMARY OF THE INVENTION

In the practice of the present invention a circuit interrupt system is provided for an engine ignition system including a coil with an electrical lead and a distributor with an electrical lead adapted for connection to the coil electrical lead with the engine running, which includes a single-pole, double-throw switch with first, second and third terminals. The second switch terminal is connected to one of the coil and distributor leads and the third switch terminal is connected to the other. The switch has a first or interrupt position connecting its first and second terminals and a second or operate position connecting its second and third terminals. A delay switch includes a first contact connected to the switch first terminal and a second contact connected to the switch third terminal. With the selector switch in its first or interrupt position the delay switch is in series with the coil and the distributor. The delay switch has a normal, closed position when no electrical current is flowing therethrough, and automatically shifts to an open position in response to an electrical current flow.

OBJECTS AND ADVANTAGES OF THE INVENTION

Exemplary objects and advantages of the present invention include: providing a system for interrupting a circuit; providing such a system for interrupting the ignition circuit of an engine; providing such a system for vehicle security and theft deterrence; providing such a system which can be concealed in a number of locations in a vehicle; providing such a system which can be installed in many vehicles with relatively minor modifications to the existing electrical systems thereof; providing such a system which includes a thermal fuse; providing such a system which comprises readily available components; providing such a system which is relatively small; providing such a system for use as a safety device; and providing such a system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, perspective view of an automobile with a circuit interrupt system embodying the present invention.

FIG. 2 is a schematic diagram of the system and a portion of the automobile ignition circuit.

FIG. 3 is a fragmentary, side elevational view of the system.

FIG. 4 is a fragmentary, rear elevational view of the system, particularly showing the wiring of selector and delay switches thereof.

DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail, the reference numeral 10 generally designates a circuit interrupt system embodying the present invention. Without limitation on the generality of the useful applications of the present invention, a preferred embodiment of the system 10 may be installed in a vehicle 11 with an internal combustion engine 12. The internal combustion engine 12 may include a coil 13 electrically linked to a distributor 14 by a relatively heavy-gauge ignition wire 15 and by a distributor wire lead 16. The distributor wire lead 16 in many vehicles comprises wire that is of a lighter gauge than the ignition wire 15. The distributor wire lead 16 may apply either a positive or negative voltage potential to the distributor 14 when the engine 12 is in operation. In some vehicles more than one distributor wire lead 16 can be found. The ignition wire 15 extends from the coil 13 to a rotor cap 18 which may, for example, be mounted on top of the distributor 14. A coil wire lead 17 extends from the coil 13 and for normal engine operation would be connected to the distributor wire lead 16. A locking ignition switch 23 may be actuated by a key 24 and is connected to the coil 13 by an ignition switch wire 25. The coil 13, the distributor 14, the ignition switch 23 and their various components and interconnecting wires collectively comprise a portion of an ignition circuit 26 of the vehicle engine 12.

The vehicle 11 may include a dashboard 28 with a storage compartment or glove box 29 having a hinged door 30 with a keyed, locking latch 31.

II. Circuit Interrupt System 10

The circuit interrupt system 10 includes a single-pole, double-throw selector switch 40 with first, second and third terminals 41, 42 and 43. A wire switch coil lead 45 extends from the second terminal 42 to an electrical connection 44 with the coil wire lead 17. A switch distributor lead 47 extends from the selector switch third terminal 43 to an electrical connection 48 with the distributor wire lead 16. The electrical connections 44 and 48 may be formed in any suitable manner, for example, with butt end electrical connectors which are adapted for receiving and clamping in electrically conductive relationship stripped ends of the distributor and coil wire leads 16, 17.

The selector switch 40 has a first or interrupt position connecting its first and second terminals 41, 42 and a second or operate position connecting its second and third terminals 42, 43. With the selector switch 40 in its first or interrupt position, the circuit interrupt system 10 is adapted to selectively interrupt current flow from the coil wire 17 to the distributor wire lead 16.

A thermal fuse switch 50 includes first and second contacts 51, 52. One or both of the contacts 51, 52 may comprise, for example, a bimetal strip 53, 54. Such bimetal strips 53, 54 are commonly used in resettable thermal fuses. With the switch 10 in its normal, closed position, the strips 53, 54 are in electrical contact with each other. With the delay switch 50 in its closed position, current can flow therethrough from the coil 13 to the distributor 14. As shown in FIG. 4, the first contact 51 has a J-shaped end 57 whereas the second contact 52 is relatively straight. With the delay switch 50 closed (FIG. 4), the first and second contacts 51, 52 are in electrically-conductive contact with each other at a contact area 58.

The delay switch contacts 51, 52 are enclosed within a delay switch enclosure or casing 59 which may comprise, for example, a glass tube or vial sealed at both ends. First and second delay switch leads 61, 62 extend from the first and second delay switch contacts 51, 52 respectively and are connected, for example by soldering, to the first and third selector switch terminals 41, 43 respectively.

The selector and delay switches 40, 50 may be substantially enclosed within a switch housing 67 including a front 68, a back 69, a top 70, a bottom 71 and opposite sides 72. The housing 67 may assume various forms, but as an example front and back portions 74, 75 may be formed separately and attached by gluing, welding, etc. along a seam line 76. The housing front 68 includes a switch opening 77 which receives the selector switch 40 whereby a back portion of the switch 40, including its terminals 41, 42 and 43 may be located within an interior 78 of the housing 67 and a rocker 79 of the selector switch 40 may be accessibly located on the outside of the housing front 68. The housing bottom 71 includes a lead opening 80 for receiving the selector switch leads 45, 47. A double-sided adhesive material 83 is placed on the housing back 69 for mounting the switch housing 67. The switch housing 67 could also be mounted by various other means, such as mechanical fasteners, adhesives, hook-and-loop fasteners, etc. The switch housing 67 and its contents form a concealable control module 73.

The delay switch 50 may comprise an automatically resetting circuit breaker or fuse of a type which is readily available. Such devices are actuated by current flow in a circuit which causes a temperature rise. The combination of electrical current and resistance in the ignition circuit 26 causes the delay switch bimetal strips 53, 54 to heat up until the contacts 51, 52 separate at the contact area 58 and open the switch 50. As an alternative to the thermally-actuated fuse 50, various other fuses and time delay switches could be employed. For example, a switch could be provided with a timer which initiates a desired delay interval when the vehicle ignition circuit is first energized. Other types of fuses could also be employed, including nonresettable fuses which would have to be replaced after they are blown and manually-resettable fuses which could be manually reset after they are opened. The delay feature could be eliminated whereby the switch 50 would open instantly in response to an electrical current therethrough. The delay interval with the thermally-actuated fuse 50 of the present invention will depend upon the amount of current flowing therethrough and the characteristics of the bimetal contact strips 53, 54. However, a delay interval in the range of three to ten seconds has been found to be generally suitable for operation of the present invention as an ignition circuit interrupt system.

III. Installation

Installation of the circuit interrupt system 10 is designed to be relatively simple for a wide variety of vehicles. A distributor wire (e.g. the distributor and coil wire leads 16, 17 in FIG. 2) extending from one side (either positive or negative) of the coil to the base of the distributor is found. This wire is cut to form severed ends 81, 82 of the distributor and coil wire leads 16, 17 respectively, which are connected to the switch coil lead 45 and the switch distributor lead 47 respectively at the electrical connections 44, 48. In vehicles with electronic ignitions, there may be an electronic control box in series with the coil and the distributor. However, the circuit interrupt system 10 ca generally be placed in series with and on one side or the other of such an electronic control box for operation as described herein.

The switch housing 67 may be placed in a concealed location. For example, the glove box 29 could receive the switch housing 67, and as an additional security measure the glove box latch 31 could be locked. Other convenient mounting places for the housing 67 include under the dashboard 28, under the car seats, on top of a sun visor, in the engine compartment, within a wheel well, underneath the vehicle, in the trunk, etc. The housing 67 may be made relatively small so that it can be installed in a relatively high number of places that are generally hidden from view. It may be desirable to mount the switch housing 67 in a location that is easily accessible by a driver from the driver's seat. In many automobiles the glove box or under the dashboard 28 may be such locations.

IV. Operation

For normal vehicle operation, the selector switch 40 is placed in its second or operate position connecting the second and third terminals 42, 43. The delay switch 50 is thus bypassed completely and the selector switch 40 electrically links the coil 13 and the distributor 14 through their respective leads 45, 47.

The circuit interrupt system 10 is placed in operation by throwing the selector switch 40 to its second position connecting the first and second terminals 41, 42. In this manner, the delay switch 50 is placed in series with the coil 13 and the distributor 14. The time delay switch 50 may permit the engine 12 to be started and run for a short period of time. The combination of electrical current and resistance causes the bimetal strips 53, 54 to increase in temperature. The bimetal strips 53, 54 may each comprise two electrically conductive materials with different thermal expansion factors. This dissimilarity of thermal expansion factors causes the strips 53, 54 to deform when their temperatures rise, whereby the contacts 51, 52 separate at the contact area 58 and the delay switch 50 opens. When the time delay switch 50 opens, the flow of electrical current from the coil 13 to the distributor 14 is interrupted and the vehicle engine 12 dies and cannot be restarted until either: (1) the selector switch 40 is shifted to its second or operate position; or (2) the bimetal strips 53, 54 of the delay switch 50 cool down enough to close at the contact area 58 and reset the switch 50 automatically. Thus, to provide security for the vehicle 11, the selector switch 40 should be left in its first or interrupt position when the vehicle 11 is left unattended. In this manner, the selector and delay switches 40, 50 cooperate to provide a measure of security for the vehicle 11.

An unauthorized person who attempts to take the vehicle 11 should not be able to drive it for more than a few seconds before the delay switch 50 opens and causes the vehicle engine 12 to die. Immediate attempts to restart the engine 12 will probably be unsuccessful as long as the delay switch 50 remains open. An unauthorized person not familiar with the vehicle 11 and its circuit interrupt system 10 might conclude that the vehicle 11 was malfunctioning or protected by an unknown security system. Either way, a theft attempt will probably be thwarted, especially if the would-be thief intends to make his or her getaway in the vehicle 11.

The delay feature of the present invention, caused by the cooperation between the selector and delay switches 40, 50, may convince a would-be thief that the vehicle 11 has a problem which will prevent it from being driven away. For example, being able to start the vehicle only to have it die might indicate that the vehicle is out of fuel or has just experienced a mechanical breakdown. A person in a hurry to complete an unauthorized removal of the vehicle would be somewhat likely to abandon it when the engine died for no apparent reason. On the other hand, if the engine had never started, the potential car thief might be inclined to conduct a careful inspection for a security device which could then be circumvented.

Having started a vehicle without authorization and with the intent of stealing it, in many situations a thief would be quite anxious to leave the area where the car was taken from as soon as possible. For one thing, starting and driving an automobile produces a certain amount of noise, which might be noticed by the vehicle's owner or others who might attempt to interrupt the theft or notify law enforcement personnel. Thus, having started a vehicle once, a would-be thief probably would not be inclined to expend much time trying to restart it. A natural reaction might be to flee the stalled vehicle as soon as possible to avoid detection and possible arrest.

With the selector switch 40, the circuit interrupt system 10 may be deployed as needed. For example, the system 10 could successfully prevent an unauthorized use of the vehicle 11, even if the unauthorized user has access to the ignition key 24. Thus, the circuit interrupt system 10 could be useful for preventing persons with access to the ignition key 24 (e.g. family members, friends, etc.) from operating the vehicle 11 without authorization.

It is to be understood that while certain forms of the present invention have been illustrated and described herein, it is not to be limited to the specific forms or arrangement of parts described and shown.

What is claimed and desired to be secured by Letters Patent is as follows:

1. An interrupt system for an ignition circuit including electrical current source means with a first lead and electrical current distribution means with a second lead, which system comprises:
   (a) a single-pole, double-throw selector switch having:
      (1) a first terminal;
      (2) a second terminal connected to the first lead from the electrical current source:
      (3) a third terminal connected to the second lead from the electrical current distribution means;
      (4) a first position connecting said first and second terminals; and (5) a second position connecting said second and third terminals; and (b) delay switching means adapted to temporarily innerconnect said switch first and third terminals and to automatically open in response to electrical current flowing therethrough.

2. The system according to claim 1 wherein:

(a) said delay switching means comprises a thermal fuse.

3. The system according to claim 2 wherein:

(a) said thermal fuse resets automatically.

4. The system according to claim 3 wherein said fuse includes:

(a) a first contact connected to said switch first terminal;

(b) a second contact connected to said switch third terminal; and (c) one of said contacts comprising a bimetal strip.

5. The circuit interrupt system according to claim 4 wherein:

(a) said fuse first and second contacts are sealed in a casing.

6. The circuit interrupt system according to claim 1 wherein:

(a) said switch and said fuse are enclosed in a housing.

7. In combination with an engine ignition system including a coil with an electrical coil lead and a distributor with an electrical distributor lead adapted for connection to said coil electrical lead with said engine running, the improvement of a circuit interrupt system, which comprises:

(a) a single-pole, double-throw selector switch including:

(1) a first terminal;

(2) a second terminal connected to one of the coil and distributor leads;

(3) a third terminal connected to the other of the coil and distributor leads;

(4) an interrupt position connecting said first and second terminals; and (5) an operate position connecting said second and third terminals; and (b) a delay switch including:

(1) a first contact connected to said switch first terminal;

(2) a second contact connected to said switch third terminal;

(3) a normal, closed position with said contacts engaged when no electrical current is flowing therethrough;

(4) an open position with said contacts disengaged; and (5) said contacts disengaging in response to electrical current flowing through said delay switch.

8. The system according to claim 7 wherein:

(a) said delay switch comprises a thermal fuse.

9. The system according to claim 8 wherein:

(a) said thermal fuse resets automatically.

10. The system according to claim 9 wherein said fuse includes:

(a) a first contact connected to said switch first terminal;

(b) a second contact connected to said switch third terminal; and (c) one of said contacts comprising a bimetal strip.

11. The circuit interrupt system according to claim 10 wherein:

(a) said fuse first and second contacts are sealed in a casing.

12. The circuit interrupt system according to claim 7 wherein:

(a) said selector switch and said delay switch are enclosed in a housing.

13. A system for interrupting an ignition circuit including a coil with a coil lead and a distributor with a distributor lead connected to said coil lead with said ignition circuit in operation, which system comprises:

(a) a single-pole, double-throw selector switch having:

(1) a first terminal;

(2) a second terminal connected to one of the coil and distributor leads;

(3) a third terminal connected to the other of the coil and distributor leads;

(4) a first position connecting said switch first and second terminals; and (5) a second position connecting said switch second and third terminals;

(b) a delay switch including:

(1) a first contact connected to said switch first terminal and comprising a bimetal strip with a J-shaped end, said strip comprising at least two metals with different thermal expansion rates;

(2) a second contact comprising a bimetal strip comprising at least two metals with different thermal expansion rates; said second contact being adapted for selective, electrically-conductive contact with said first strip J-end at a contact area;

(3) said delay switch having a normal, closed position with said contacts thereof in electrically-conductive engagement at said contact area and an open position with said contacts disengaged; and (4) said delay switch contacts being adapted to automatically disengage in response to electrical current flowing through said delay circuit;

(c) a switch housing including:

(1) a front with an opening receiving said selector switch;

(2) a back;

(3) a top;

(4) a bottom with a lead opening; and (5) opposite sides;

(6) said selector and delay switches being adapted for placement substantially within said housing; and (7) a double-sided adhesive material secured to said housing back and adapted for adhesive attachment to an object;

(d) a pair of electrical leads extending through said lead opening in said housing bottom, each of said electrical leads being adapted for connection to one of the coil and the distributor electrical leads; and (e) a pair of butt-end splice connectors each splicing a respective selector switch lead to one of the coil and distributor leads.

* * * * *